S. BALLARD.
SAW SET.
APPLICATION FILED JULY 2, 1914.
1,131,105.
Patented Mar. 9, 1915.
2 SHEETS—SHEET 1.
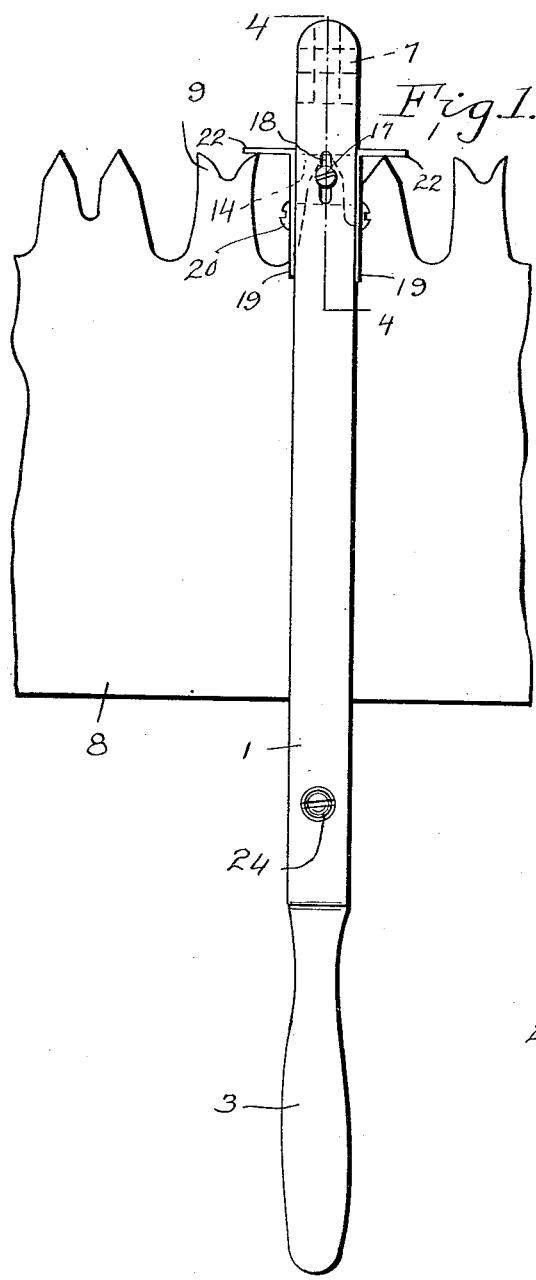
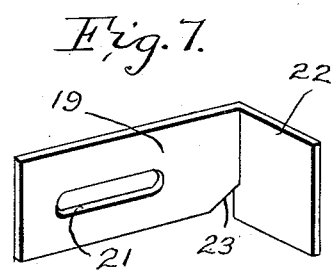
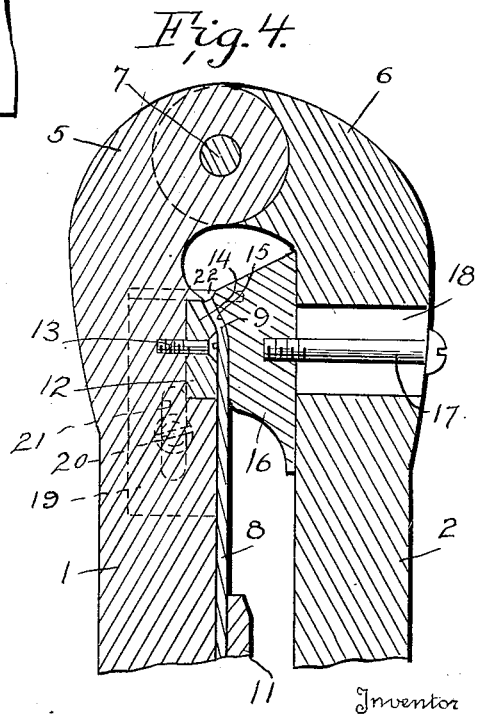
Witnesses
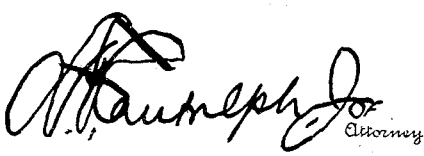
Inventor
S. Ballard

S. BALLARD.
SAW SET.
APPLICATION FILED JULY 2, 1914.

1,131,105.

Patented Mar. 9, 1915.
2 SHEETS—SHEET 2.

Witnesses
R. M. Jones
Wm. S. Fowler

Inventor
S. Ballard
By
Attorney

UNITED STATES PATENT OFFICE.

SYLVESTER BALLARD, OF CLOVERDALE, WEST VIRGINIA.

SAW-SET.

1,131,105.  Specification of Letters Patent.  Patented Mar. 9, 1915.

Application filed July 2, 1914. Serial No. 848,644.

*To all whom it may concern:*

Be it known that I, SYLVESTER BALLARD, a citizen of the United States, residing at Cloverdale, in the county of Mercer and State of West Virginia, have invented certain new and useful Improvements in Saw-Sets, of which the following is a specification.

This invention comprehends certain new and useful improvements in saw sets and has for its primary object to provide a saw set including pivoted clamping levers having coöperating saw setting members and means for drawing said clamping levers together to clamp the saw teeth in said saw setting members, and means carried between said levers for guiding the same upon the saw.

This invention has for a further object to provide a saw set which will be of simple and improved construction and operation and which may be readily applied to or removed from saws of various type and adapted to set the teeth uniformly.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 2:
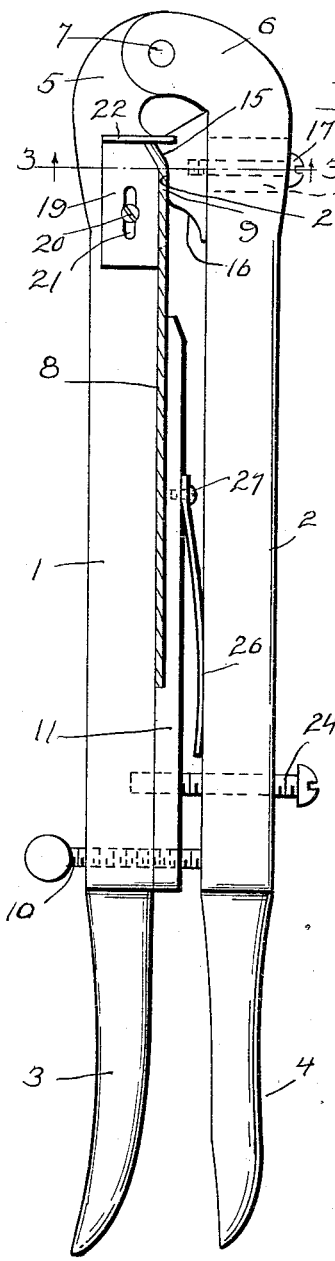
Figure 3:
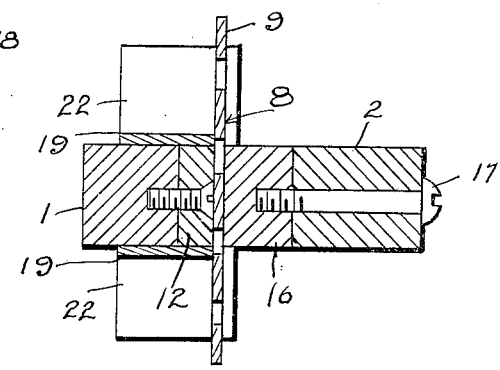
Figure 5:
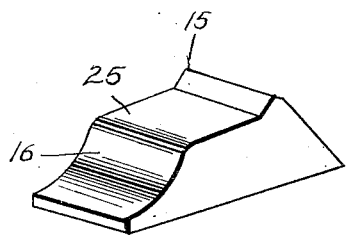
Figure 6:
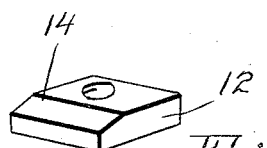

Figure 1 is a plan view of the device in position upon a saw to set one of the teeth thereof, Fig. 2 is a side elevation thereof, with the saw in section, Fig. 3 is a detail transverse section on the plane of line 3—3 of Fig. 2, looking in the direction indicated by the arrow, Fig. 4 is a fragmentary detail enlarged section on the plane of line 4—4 of Fig. 1, Figs. 5 and 6 are detail perspective views of the saw setting blocks removed, and Fig. 7 is a detail perspective view of one of the tooth engaging adjusting plates.

Referring in detail to the drawings by numerals, 1 designates the anvil carrying lever and 2 the hammer carrying lever which have their free ends reduced and formed into hand grips 3 and 4 respectively, while the opposite ends of said levers 1 and 2 are curved toward one another, as shown at 5 and 6 respectively, and connected by the pivot pin 7, it being understood that said ends are provided with interlocking ears through which the pin 7 is positioned transversely to place the levers 1 and 2 parallel with one another when the device is in position upon a saw 8 for the purpose of setting the teeth 9 thereof.

The lever 1 has a screw 10 engaged therethrough and through the enlarged end of a saw holding member 11 to draw said enlarged end of the member 11 against the inner face of the lever 1 and thereby hold the body of the saw 8 resting upon the reduced portion of the member 11 and against the inner face of the lever 1, with the saw 8 in such position that by moving the levers 1 and 2 longitudinally of the saw 8, the teeth 9 of said saw will be brought in consecutive order upon the anvil block 12 secured in the inner face of said lever 1, adjacent the pivoted or inner end thereof, by means of a securing member 13 such as a screw or the like, the handle block 12 having a beveled portion 14 against which the teeth 9 are adapted to be forced by the inclined working portion 15 of the hammer block 16 secured against the inner face of the lever 2, adjacent the pivoted or inner end thereof and adapted to be adjusted longitudinally of said lever 2, by means of the screw 17 by which said hammer block 16 is carried, said screw 17 being engaged through the slot 18 in said lever 2 and adapted to be moved to proper position in said slot, which it will be understood extends longitudinally of the lever 2, the head of said screw 17 bearing against the outer face of the lever 2.

It will be readily seen that by loosening the screw 20 and by moving forwardly the tooth engaging adjusting plates 19 positioned upon opposite sides of the handle carrying lever 1, the device may be moved longitudinally of the saw 8 until the anvil block 12 is brought opposite the proper tooth 9, when the screw 20 may again be tightened and the plates 19 adjusted by moving the same longitudinally of the lever 1 upon the screw 20 which projects through the elongated longitudinal slots 21 of said plates 19, until the right angled free ends 22 of said plates 19 are engaged against the points of the teeth 9 to the opposite sides of the tooth to be set. This will serve to properly adjust the entire device upon the saw 8 so that the tooth will be properly set upon operation of the device. It will be understood that the right angled ends 22 of the plates 19 project slightly below the main or body portions of said plates 19, as will be readily seen by referring to the drawings, in order that said ends may be engaged against the ends of the teeth, while the main portions of said plates will avoid the body of the saw 8 engaged against the inner face of the lever 1 and the lower corners of the outer ends of the plates 19 are cut away, as shown at 23. After these parts have been properly adjusted, levers 1 and 2 may be brought together by operation of the clamping screw 24 in the proper direction, said clamping screw being carried by the lever 2 and engaged in the lever 1, thereby adjusting the hammer block 16 toward the anvil block 12 and causing the inclined portion 15 of said hammer block 16 to bend the end of the tooth 9 against the beveled portion 14 of the anvil block 12 while the flat portion 25 of said hammer block 16 bears against the adjacent portion of the body of the saw 8 to assist in securing said saw against movement and thereby assuring proper setting of the tooth.

In order to further assist in securing the body of the saw 8 against movement, a leaf spring 26 is provided and has one end secured to the lower or outer face of the member 11 opposite the body of the saw 8, as shown at 27, while the greater portion of said curved leaf spring 26 rests upon the inner face of the lever 2, whereby as the levers 1 and 2 are forced toward one another, the reduced portion of the member 11 will be pressed tightly against the body of the saw 8, thereby securely clamping the same between said reduced portion of the member 11 and the lever 1. It will also be understood that when the clamping screw 24 is loosened, the spring 26 will serve to separate the levers 1 and 2.

It will be readily understood that as the end of the screw 10 bears against the hammer carrying lever 2, said screw 10 may be readily adjusted to limit the movement of said lever 2 toward the anvil carrying lever 1, during operation of the device, outward movement of said hammer carrying lever 2 being limited by the head of the clamping screw 24.

From the foregoing it will be readily seen that I have provided a saw set which will be of extremely simple construction and operation as well as highly efficient in use and which may be readily and properly adjusted upon a saw for the purpose of setting the teeth thereof, and the parts are formed and connected in such manner that should any of such parts become worn or broken, they may be readily replaced at small cost.

While I have shown and described the preferred embodiment of my invention, it will be understood that minor changes in the details of construction, combination and arrangement of parts may be made without departing from the spirit and scope of the invention as claimed, or sacrificing any of the advantages thereof.

What is claimed is:—

A saw set comprising a pair of levers positioned parallel to one another and having their inner ends turned and interlocked, said inner ends being pivotally connected, a saw body supporting member secured against the inner face of one of said levers to hold a saw in position against said lever, an anvil block mounted upon the inner face of said lever adjacent the inner end thereof and having a beveled portion, a hammer block mounted upon the remaining lever opposite the anvil block and having a beveled face to coöperate with the beveled portion of said anvil block and force the saw tooth against the latter, means for drawing together said levers, and a flat leaf spring member carried by said saw supporting member and pressing against the inner face of the second mentioned lever.

In testimony whereof I affix my signature in presence of two witnesses.

SYLVESTER BALLARD.

Witnesses:
 A. C. DAVIS,
 A. D. WOOD.

Copies of this patent may be obtained for five cents each, by addressing the "Commissioner of Patents, Washington, D. C."